United States Patent
Mussallem, III

(10) Patent No.: US 6,440,341 B1
(45) Date of Patent: Aug. 27, 2002

(54) FLAME SET UNDERLAY AND PROCESS FOR MAKING SAME

(76) Inventor: Charles S. Mussallem, III, 5830 Clifton Ave., Jacksonville, FL (US) 32211

(*) Notice: Subject to any disclaimer, the term of this patent is extended or adjusted under 35 U.S.C. 154(b) by 0 days.

(21) Appl. No.: 09/413,166

(22) Filed: Oct. 7, 1999

(51) Int. Cl.[7] .......................... B29C 35/02; B29C 67/00; B32B 25/12; D04H 1/48
(52) U.S. Cl. .......................... 264/80; 28/112; 264/129; 264/171.24
(58) Field of Search ...................... 264/80, 129, 171.24; 28/112

(56) References Cited

U.S. PATENT DOCUMENTS 4,360,554 A * 11/1982 Campbell et al. ............. 428/91
4,477,938 A * 10/1984 Rogut ........................... 15/118
6,200,662 B1 * 3/2001 Mussallem, III ............. 428/95

FOREIGN PATENT DOCUMENTS

JP  61138763 A  *  6/1986

* cited by examiner

Primary Examiner—Leo B. Tentoni
(74) Attorney, Agent, or Firm—Arthur G. Yeager

(57) ABSTRACT

A rug underlay comprising a fiber batting needle-punched to a core thickness of 0.25 to 0.5 inch with one side being flame-treated to produce a surface of matted melted fibers with random stiff spikes of fiber projecting upwardly therefrom; and the other side being coated with a rubber material. The process for making same includes passing the core beneath burners about 4–8 inches therebelow and the burners produce about 20,000 BTU's /hour/foot of burn length measured transversely of the core.

5 Claims, 2 Drawing Sheets

FLAME SET UNDERLAY AND PROCESS FOR MAKING SAME

CROSS REFERENCE TO RELATED APPLICATIONS

Applicant's copending application entitled RUBBER COATED RUG UNDERLAY WITHOUT SCRIM, U.S. Pat. No. 6,200,662 B1, dated Mar. 13, 2001 describes and claims a rubber-coated underlay without scrim that has a somewhat similar basic structure to the underlay of the present invention.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention relates to the field of underlays for rugs and, more particularly, to underlays that have been flame-treated to produce a surface that will cling to the underside of the rug.

2. Description of Related Art

Underlays for area rugs have been known for many years for the purpose of providing a soft feeling to a person walking on the carpet or rug. In more recent times it has been known that improvements could be made to the underlay so as to provide not only a softer feeling underfoot but also to make the underlay less likely to slip when one walked on the area rug.

BRIEF SUMMARY OF THE INVENTION

The present invention provides a rug underlay that can support an individual rug, such as an Oriental Rug, safely against slippage and at the same time provide a soft feeling underfoot to one walking on the rug. One side of the underlay is subjected to the flame from a burner to produce bristle that will cling to the overlying rug; and the other side is given a rubber coating to provide a nonslip surface to lie on a polished wooden floor or the like.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

This invention relates to a novel underlay for carpet or a rug; frequently an Oriental rug used as a eye-catching setting for a piece of furniture, e.g., a coffee table or a desk, that is exhibited as a showpiece. The improved underlay of this invention has a flame-treated upper layer which is then placed in contact with the backing of the carpet or rug upon which the showpiece furniture is exhibited. That upper flame-treated surface of the underlay is a mass of partially melted synthetic plastic fibers that are fixed so that they do not easily come apart as they would from a pressed mass of loose fibers; and yet the melted fibrous layer does provide some extending fibrous ends that are capable of becoming entangled with the backing of the rug or carpet above and providing holding power to prevent sliding of the rug over the underlay. The flame-treated upper layer also provides lateral stability to the underlay and with the rubber backing on the bottom of the underlay effectively maintains the area rug in place.

The first step in the preparation of the underlay of this invention is to prepare a thin matted fiber structure that can be transformed into a suitable underlay. This is accomplished by the well-known procedure of needle-punching a batt of loose fibers until a thin (e.g., 0.25–0.50 inch) mat of entangled fibers is produced that is self-supporting. In the past it has been common to incorporate into the mat a reinforcing center structure of a scrim, which is a woven screen or net of synthetic filaments to provide a stiff basic central support on which the batt of fibers were needle-punched to a thin, strong supporting skeleton. Such a scrim may be incorporated in the present underlay, if desired, or it may be omitted without losing too much of its stability for most applications. The original batt of fibers must be needle-punched, however, to produce the necessary structural strength and interlocked fibers to function as a satisfactory underlay. Generally, the batt is needle-punched from one side and may be turned over and subjected to needle-punching in the opposite direction until the proper thickness and strength has been reached. The final product is a thin cohesive mat of entangled fibers of almost any type of synthetic fiber or filament used in rugs or carpets. This includes, but is not limited to polyolefins, polyamides, polyacrylics, polyesters, polyaldehydes, polycarbonates and mixtures thereof. There are available large quantities of such fibers as waste from the manufacturing looms that produce rugs, carpets and other materials from synthetic fiber materials and may include recycled fiber materials from reclaimed rugs, carpets, etc.

Figure 3:
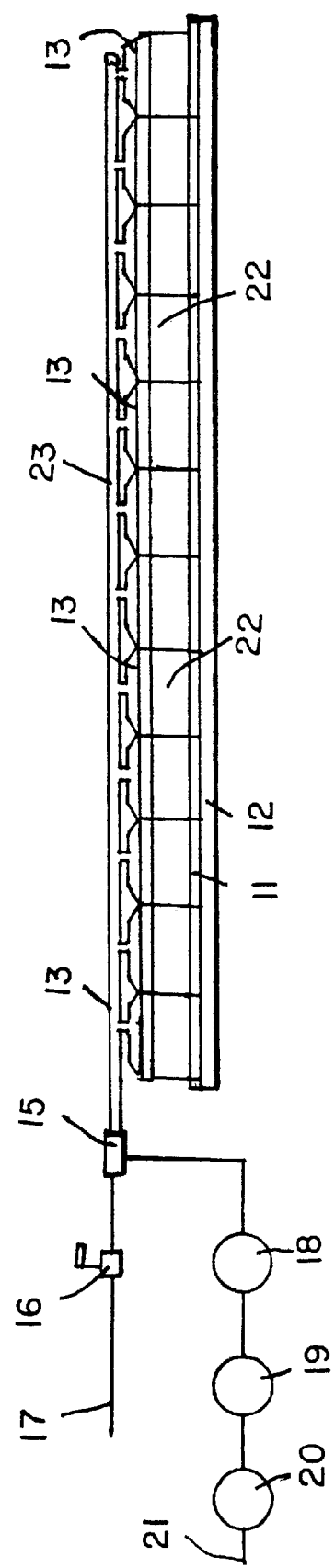
FIG. 3 is a schematic front elevational view of passing the underlay through the flames of burners to produce some bristle-like fibers projecting upwardly from the underlay and available to contact the lower surface of the overlying rug.

The next step in producing the underlay of this invention is to subject one side 27 of the underlay to the flame-treatment shown generally in FIG. 3 of the attached drawings. This illustration is an end view looking at the underlay 11 as it passes under burners 13 that are directing their flames 22 downwardly onto the underlay 11 as it passes by (running into the page of the drawing). This drawing represents the treatment of an underlay, for example, 12 feet wide passing under a line of 12 burners, each 1 foot in length, thus, providing 12 feet of flames to treat 12 feet of underlay. The underlay 11 generally is provided as a sheet of underlay 12 feet wide and passing at a selected speed under the flames 22 of burners 13 so as to provide the heat necessary to partially melt the fibers at the surface of the underlay being bathed in flame. Natural gas may be used in the burners 13 or any other inflammable gas that will provide the necessary heat which has been calculated to be approximately 10,200 BTU's per hour per burner or 244,800 BTU's per hour for the entire treatment apparatus. The underlay 11 is positioned 4–8 inches below the burner nozzles 13. The gas is fed from a supply through line 21 having a shutoff cock 20, a solenoid valve 19, and a zero air/gas regulator 18.

The supply of gas may be a tank or a supply pipeline. Air enters the line at 17 through a throttle control valve 16 and an aspirator mixer 15 where the air is mixed with the gas from regulator 18 to fill header supply line 23 that feeds each of burners 13 that are placed side-by-side so as to provide a wall of flame from burners 13 treating the upper surface of underlay 11 as it passes underneath. The flame-treated surface of the underlay that has been given this treatment is a mass of melted fibers and unmelted fibers that exhibit some spikes of melted fibers projecting upwardly from the treated surface that shows areas of melted and resolidified plastic with spikes of fibers projecting upwardly like stiff fur on a skin. These spikes provide and attachment means to anchor a rug to the underlay to maintain it in position.

Figure 1:
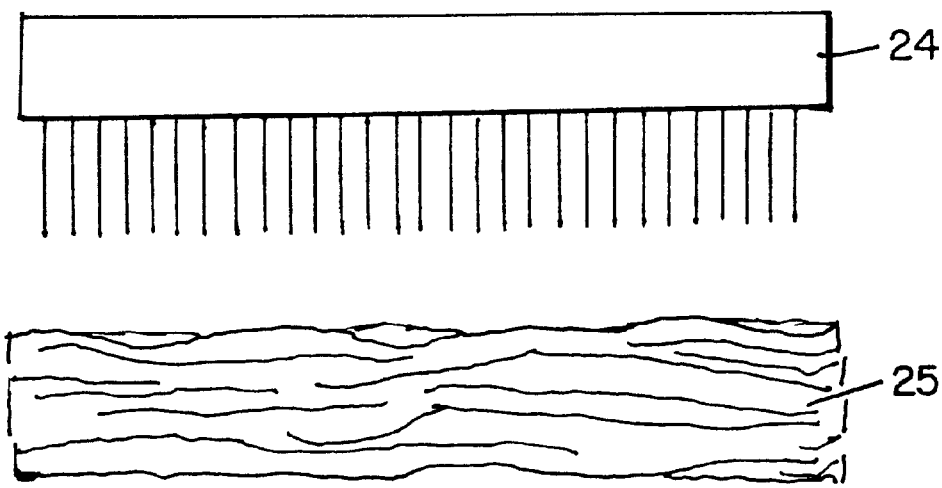
FIG. 1 is a schematic front elevational view of a batt of fibers about to be subjected to a needle-punching operation.
Figure 2:
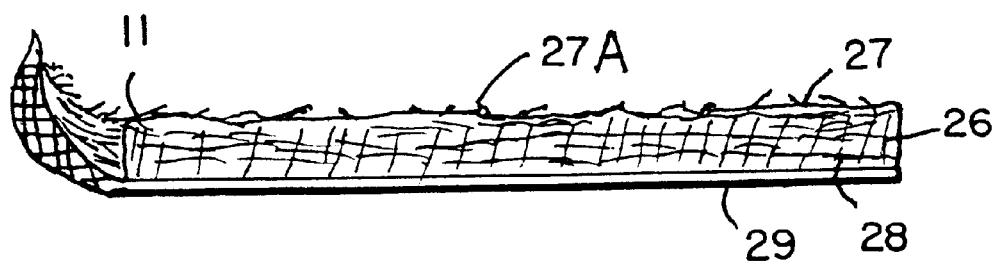
FIG. 2 is a vertical cross-sectional view of the finished overlay.

After the flame treatment the underlay 11 is coated on the bottom side 28 with a rubbery layer 29 that might in most instances be laid directly on a polished wooden floor. Therefore, the final underlay 11 would look like FIG. 2 showing a cross-section of the finished product with a central core 26 of a needle-punched mass of fibers (with or without a central scrim layer) an upper layer 27 of flame-treated rug fiber having spikes 27A, and a lower layer 29 of embossed rubber latex on the bottom side 28 of underlay 11. The lower layer is produced by spraying the underlay 11 with rubber latex, allowing it to harden while rolling it with a carved surface that will impart a chosen design in an embossing technique, the design, e.g., being a checkerboard arrangement of squares, for example, or other non-slip designs.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A process for making a rug underlay comprising the steps of:

A. needle-punching a layer of fiber batting from at least an upper surface thereof to form a thin fibrous core having intermingled fibers;

B. direct flame singeing by a plurality of spaced and aligned burners of said upper surface to melt a top portion of the fibers to produce hardened spikes of said fibers projecting upwardly above a general plane of said upper surface; and C. coating the lower surface of the core with a layer of cured rubbery material.

2. The process of claim 1 wherein step B is accomplished by passing the core with its upper surface facing and beneath the burners producing the flame.

3. The process of claim 2 wherein the core is positioned approximately 4–8 inches below the burners.

4. The. process of claim 2 wherein the flame singeing of said upper surface is accomplished by a flame producing about 20,400 BTU's per hour per foot of burner length measured transverse to the direction of travel of the core beneath burners producing the flame.

5. The process of claim 4 wherein the core is positioned approximately 4–8 inches below the burners.

* * * * *